United States Patent
Piepenbrink et al.

(10) Patent No.: US 10,068,269 B2
(45) Date of Patent: Sep. 4, 2018

(54) METHOD FOR CONTROLLING ELECTRONIC STOREFRONTS IN A MULTIMEDIA CONTENT DISTRIBUTION NETWORK

(75) Inventors: David J. Piepenbrink, Chicago, IL (US); Lee M. Chow, Naperville, IL (US); James T. Sofos, Aurora, IL (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 524 days.

(21) Appl. No.: 12/617,464

(22) Filed: Nov. 12, 2009

(65) Prior Publication Data

US 2011/0112930 A1   May 12, 2011

(51) Int. Cl.
| | |
|---|---|
| G06Q 30/00 | (2012.01) |
| G06F 17/30 | (2006.01) |
| G06Q 30/06 | (2012.01) |
| G06Q 30/04 | (2012.01) |

(52) U.S. Cl.
CPC ......... *G06Q 30/0603* (2013.01); *G06Q 30/04* (2013.01); *G06Q 30/0607* (2013.01); *G06Q 30/0641* (2013.01)

(58) Field of Classification Search
CPC .................................................. G06Q 30/0603
USPC ..................................................... 705/26–27
See application file for complete search history.

(56) References Cited

U.S. PATENT DOCUMENTS

| | | | |
|---|---|---|---|
| 6,961,858 B2 | 11/2005 | Fransdonk | |
| 7,107,462 B2 | 9/2006 | Fransdonk | |
| 7,130,820 B2 | 10/2006 | Song | |
| 7,213,047 B2 | 5/2007 | Yeager et al. | |
| 7,231,660 B1 | 6/2007 | Daude et al. | |
| 7,237,255 B2 | 6/2007 | Fransdonk | |
| 7,404,084 B2 | 7/2008 | Fransdonk | |
| 7,415,721 B2 | 8/2008 | Franksdonk | |
| 7,509,496 B2 | 3/2009 | Skog et al. | |
| 7,549,051 B2 | 6/2009 | Dillaway et al. | |
| 7,565,546 B2 | 7/2009 | Candelore | |
| 7,568,114 B1 | 7/2009 | Schlafly | |
| 7,614,083 B2 | 11/2009 | Khuti et al. | |
| 7,627,501 B2 | 12/2009 | Bagsby et al. | |
| 7,631,325 B2 | 12/2009 | Rys et al. | |
| 7,747,706 B2 | 6/2010 | Ran | |
| 7,793,337 B2 | 9/2010 | Casey et al. | |
| 7,822,973 B2 | 10/2010 | Okaya | |
| 7,873,578 B2 | 1/2011 | Johnson et al. | |
| 7,917,942 B2 | 3/2011 | Costa-Requena et al. | |

(Continued)

OTHER PUBLICATIONS

Gerhart, A. (May 17, 2000). On the Move; in the future, we'll be able to take our virtual connections with us wherever we go. The Washington Post Retrieved from https://search.proquest.com/docview/408630233?accountid=14753.*

*Primary Examiner* — Kathleen Palavecino
(74) *Attorney, Agent, or Firm* — Greenblum & Bernstein, P.L.C.

(57) ABSTRACT

A method and system for limiting spending in a multimedia content distribution network involves receiving spending limits from an Internet-protocol television portal, a web portal, or a mobile portal. The spending limits may be provided by a network user and may be usable to limit access to multimedia programs. The spending limits may be applied using a unified storefront application, which provides access to multimedia content via an Internet-protocol television portal, a web portal, and a mobile portal.

11 Claims, 10 Drawing Sheets

(56) References Cited

U.S. PATENT DOCUMENTS

| | | |
|---|---|---|
| 2002/0052754 A1* | 5/2002 | Joyce et al. .................... 705/1 |
| 2002/0083002 A1* | 6/2002 | Menez et al. ................... 705/52 |
| 2002/0111863 A1 | 8/2002 | Landesmann |
| 2003/0115105 A1 | 1/2003 | Lin et al. |
| 2003/0079124 A1 | 4/2003 | Serebrennikov |
| 2003/0151621 A1* | 8/2003 | McEvilly et al. ............ 345/744 |
| 2003/0163684 A1 | 8/2003 | Fransdonk |
| 2003/0177498 A1* | 9/2003 | Ellis et al. ..................... 725/60 |
| 2004/0088257 A1 | 5/2004 | Wong et al. |
| 2004/0117491 A1* | 6/2004 | Karaoguz ........... H04L 12/2803 709/229 |
| 2005/0114367 A1 | 5/2005 | Serebrennikov |
| 2005/0125822 A1 | 6/2005 | Casement et al. |
| 2005/0204389 A1* | 9/2005 | Proehl et al. .................. 725/60 |
| 2006/0085824 A1 | 4/2006 | Bruck et al. |
| 2006/0151598 A1 | 7/2006 | Chen et al. |
| 2006/0195888 A1 | 8/2006 | Kalonji et al. |
| 2007/0028258 A1* | 2/2007 | Wollmershauser et al. .... 725/29 |
| 2007/0097860 A1 | 5/2007 | Rys et al. |
| 2007/0101351 A1 | 5/2007 | Bagsby et al. |
| 2008/0109362 A1 | 5/2008 | Fransdonk |
| 2008/0114653 A1 | 5/2008 | Harmon et al. |
| 2008/0120668 A1 | 5/2008 | Yau |
| 2008/0167992 A1 | 7/2008 | Kokernak et al. |
| 2008/0168487 A1 | 7/2008 | Chow et al. |
| 2008/0235101 A1 | 9/2008 | Piepenbrink et al. |
| 2008/0235104 A1 | 9/2008 | Chow et al. |
| 2008/0235278 A1 | 9/2008 | Piepenbrink et al. |
| 2009/0119696 A1 | 5/2009 | Chow et al. |
| 2009/0119703 A1 | 5/2009 | Piepenbrink et al. |
| 2009/0132383 A1 | 5/2009 | Piepenbrink et al. |
| 2009/0138964 A1* | 5/2009 | Headings et al. .............. 726/17 |
| 2009/0164316 A1 | 6/2009 | Piepenbrink et al. |
| 2009/0222335 A1 | 9/2009 | Gopal et al. |
| 2010/0115627 A1 | 5/2010 | Chow et al. |
| 2010/0122280 A1 | 5/2010 | Sofos et al. |
| 2010/0124399 A1 | 5/2010 | Sofos et al. |
| 2010/0125866 A1 | 5/2010 | Sofos et al. |
| 2010/0125867 A1 | 5/2010 | Sofos et al. |
| 2010/0138855 A1 | 6/2010 | Sofos et al. |
| 2010/0146607 A1 | 6/2010 | Piepenbrink et al. |
| 2010/0150521 A1 | 6/2010 | Chow et al. |
| 2010/0162319 A1 | 6/2010 | Piepenbrink et al. |
| 2010/0162342 A1 | 6/2010 | Piepenbrink et al. |
| 2010/0162363 A1 | 6/2010 | Piepenbrink et al. |
| 2010/0251280 A1 | 9/2010 | Sofos et al. |
| 2010/0333032 A1 | 12/2010 | Lau et al. |
| 2010/0333137 A1 | 12/2010 | Hamano et al. |
| 2010/0333151 A1 | 12/2010 | Huang |
| 2011/0022689 A1 | 1/2011 | Piepenbrink et al. |
| 2011/0041147 A1 | 2/2011 | Piepenbrink et al. |
| 2011/0041148 A1 | 2/2011 | Piepenbrink et al. |
| 2011/0041149 A1 | 2/2011 | Piepenbrink et al. |
| 2011/0055866 A1 | 3/2011 | Piepenbrink et al. |
| 2011/0066652 A1 | 3/2011 | Piepenbrink et al. |
| 2011/0066674 A1 | 3/2011 | Piepenbrink et al. |
| 2011/0067049 A1 | 3/2011 | Piepenbrink et al. |
| 2011/0112930 A1 | 5/2011 | Piepenbrink et al. |
| 2011/0119696 A1 | 5/2011 | Piepenbrink et al. |
| 2011/0119721 A1 | 5/2011 | Piepenbrink et al. |
| 2011/0119738 A1 | 5/2011 | Piepenbrink et al. |
| 2011/0153856 A1 | 6/2011 | Piepenbrink et al. |
| 2011/0154382 A1 | 6/2011 | Chow et al. |
| 2011/0154401 A1 | 6/2011 | Chow et al. |
| 2011/0154404 A1 | 6/2011 | Piepenbrink et al. |

\* cited by examiner

US 10,068,269 B2

METHOD FOR CONTROLLING ELECTRONIC STOREFRONTS IN A MULTIMEDIA CONTENT DISTRIBUTION NETWORK

BACKGROUND

Field of the Disclosure

The present disclosure relates to presenting assets related to multimedia content and, more particularly, to managing acquisition and viewing controls for multimedia content.

Description of the Related Art

Modern multimedia content distribution networks (MCDN) provide a vast array of multimedia content assets available for purchase across multiple access points. The ease of purchasing multimedia assets may give MCDN users the impression that uncontrolled spending on the MCDN is an inherent risk.

DESCRIPTION OF THE EMBODIMENT(S)

Figure 1:
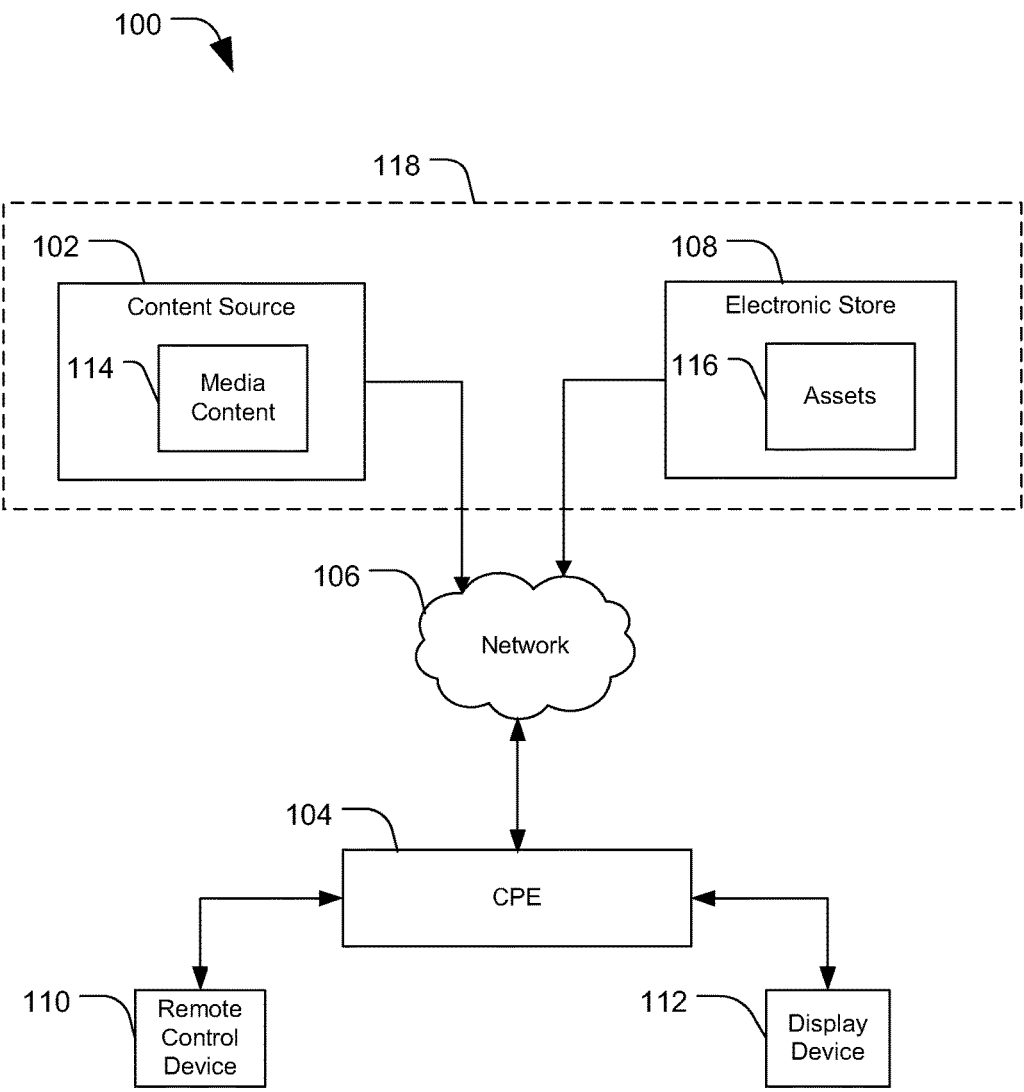
FIG. 1 is a block diagram of selected elements of an embodiment of an MCDN.

In one aspect, a disclosed method for limiting spending in a unified storefront (USF) application of an MCDN may include storing spending limit information associated with an authorized user of the MCDN, receiving a request to access a multimedia program, and applying the spending limit information to constrain access to the multimedia program via at least one of: a USF web portal, a USF Internet-protocol television (IPTV) portal provided by the MCDN, and a USF mobile portal. In response to the spending limit information indicating that the request would result in exceeding a spending limit if allowed, applying the spending limit information to constrain access may further include denying the request. In response to the spending limit information indicating that the request would not result in exceeding a spending limit if allowed, request may be allowed. The spending limit information may be received from the USF web portal, the USF IPTV portal, the USF mobile portal, or a combination thereof.

In certain embodiments, the spending limit information may indicate spending limits associated with at least one sub-account administered using an MCDN account associated with the authorized user, while the at least one sub-account may be configured to provide access to multimedia content using the MCDN account. The spending limit information may indicate a predetermined time period to access multimedia content using an MCDN account. The spending limit information may indicate a maximum number of accessed multimedia programs. The spending limit information may be received from the authorized user.

In a further aspect, a disclosed customer premises equipment (CPE) for use within a client configuration of an MCDN includes a processor and memory media accessible to the processor, including instructions executable by the processor. The instructions may be executable by the processor to receive spending limit information from a user of an MCDN client, send the spending limit information to an MCDN server, and use the spending limit information to limit access to MCDN multimedia content from at least one of: an Internet website and a mobile wireless network platform. The CPE may be the MCDN client configuration, while the spending limit information may be usable with an MCDN user account associated with the CPE. The CPE may further include instructions executable to use the spending limit information to limit access to MCDN multimedia content from the CPE. The spending limit information may include spending limits associated with at least one user sub-account administered using the MCDN user account, while the at least one sub-account may be configured to provide access to multimedia content. The CPE may still further include instructions executable to modify spending limit information associated with the MCDN user account and the at least one user sub-account.

In yet another aspect, disclosed computer-readable memory media include executable instructions for implementing an MCDN. The instructions may be executable to implement spending limits for receiving multimedia content, as will be described in detail below.

Multimedia content (e.g., a television program) is provided to users by service providers that provide access to the content over the Internet or other networks. Portions of the multimedia content may be unsuitable for some users, and local administrators (e.g., parents) may wish to control access to the content. In some cases, an administrator may wish to limit the amount of multimedia content received by some or all local users. In such cases, parental or administrator controls may be implemented to provide limited access to available multimedia content.

In the following description, details are set forth by way of example to facilitate discussion of the disclosed subject matter. It should be apparent to a person of ordinary skill in the field, however, that the disclosed embodiments are exemplary and not exhaustive of all possible embodiments.

FIG. 1 is a block diagram of a particular illustrative embodiment of system 100 to present assets related to media content. System 100 includes content source 102 that communicates with CPE 104 (which may include, for example, a set-top box (STB) device) via network 106. Content source 102 includes a memory to store media content 114. CPE 104 can receive input from remote control device 110 and can communicate audio and video to display device 112. In a particular embodiment, network 106 may be a public network, such as the Internet, or a private access network, such as an MCDN.

Content source 102 and CPE 104 can communicate with electronic store server 108 via network 106. Electronic store server 108 includes data related to one or more assets 116, which may be related to media content 114. In an illustrative embodiment, server system 118 can include both content source 102 and electronic store server 108, providing a single interface for media content distribution and for presenting assets related to the media content.

In one embodiment, server system 118 receives a request for an electronic storefront from a destination device, such as CPE 104. Server system 118 can identify media content received at CPE 104 based on the request or based on data from content source 102. Server system 118 (or electronic store server 108) can generate an electronic storefront that includes selectable indicators related to assets selected from assets 116 based on the media content. In certain embodiments, assets 116 can include data related to physical assets and electronic assets that are related to the media content. For example, the physical assets may include articles of clothing (hats, shirts, jackets, other articles of clothing, or any combination thereof), posters (movie posters, actor photographs, other images, or any combination thereof), soundtracks (e.g., compact discs (CDs)), other physical products, or any combination thereof. The electronic assets can include digital wallpaper (movie images, actor images, other images, or any combination thereof), ring tones (audio clips from media content, soundtrack clips, other audio clips, or any combination thereof), downloadable soundtracks, Video on Demand (VOD) content, video clips, other electronic assets, or any combination thereof. In general, each of the assets may have different associated access rights. For example, a ring tone electronic asset may allow unrestricted use of the ring tone after purchase, while a movie download may allow a limited number of viewings or unlimited access for a period of time.

In a particular illustrative embodiment, server system 118 generates an electronic storefront including a graphical user interface (GUI). The GUI includes multiple selectable indicators related to assets that are associated with media content that is received at CPE 104. Server system 118 can target specific assets to CPE 104 based on media content received at CPE 104.

In some embodiments, the GUI may include information describing selected assets 116 or describing a plurality of purchase options related to the selected assets. The information may be personalized to a user or subscriber of CPE 104. In another particular embodiment, the information describing the asset or the information describing the plurality of purchase options may be personalized to an account associated with CPE 104.

In an embodiment, server system 118 may provide a plurality of purchase options, including non-exclusive offers and exclusive customized offers. The exclusive customized offers may be based on past purchase history, viewing history, geographic location, length of service with a service provider, time of day, an account status, a type of account, or any combination thereof. The non-exclusive offers or the exclusive offers may be based on a sponsorship setting of a particular television program, a sponsorship of a particular television channel, or a sponsorship of the television program service. For example, the sponsorship setting may include information about television advertisers that have certain interactive features associated with their advertising content or with other television content. In some cases, advertisers may associate with this advertising content interactive features such as: information gathering interactive features (e.g., polls); entertainment interactive features (e.g., games); informative interactive features (e.g., product information queries); product request interactive features (e.g., order forms); or any combination thereof.

In another illustrative embodiment, the information describing an asset may include information related to a promotion. For example, server system 118 may be adapted to cross-sell products for a particular promotion. The promotion may be directed to a particular movie, such as King Kong, where particular regions may be targeted for the promotion. Subscribers in San Antonio, Tex., for example, may receive discounted pricing for accessing the movie "King Kong." Such pricing promotions may be used to entice viewers to access such services.

In one embodiment, the promotion may have specific assets associated with it, such as a particular movie. The particular promotion may include multiple related assets, such as a movie (and products related to the movie) t-shirts, baseball hats, coffee cups, shot glasses, CDs, other paraphernalia, or any combination thereof. Additionally, the promotion may include multiple related electronic assets, such as video clips, computer desktop wallpaper, a downloadable soundtrack, ring tones for a mobile phone, other electronic assets, or any combination thereof. Further, the promotion may include a discounted subscription service, such as an option to modify a subscription associated with the destination device to add a movie channel package, to subscribe to a number of VOD movies per month, another service, or any combination thereof.

More than one promotion may be associated with a particular asset. In a particular embodiment, multiple promotions from more than one asset provider may be included in assets 116, and multiple purchase options may be provided for accessing selected assets. In a particular embodiment, server system 118 may provide an interactive feature to direct a customer to an asset that is associated with a particular promotion. For example, if destination CPE 104 is associated with a subscriber in the San Antonio, Tex. area, server system 118 may provide a GUI that includes multiple promotional offers that are available to a particular subscriber. Server system 118 may provide a feature that allows CPE 104 to provide a display of a best promotional offer (e.g. lowest price, largest number of related assets, popular promotional options based on selections by other subscribers, other criteria, or any combination thereof). In one illustrative embodiment, server system 118 may recommend a particular payment option from multiple available payment options. The recommendation may be based on the subscriber account associated with CPE 104, based on an active promotion, based on payment option expiration (such as an expiration date associated with a payment coupon or credit), or any combination thereof.

In an illustrative embodiment, CPE 104 may receive data that can be executed by a processor to generate a GUI, which may be provided to display device 112. The GUI can include multiple purchasable assets of different types and multiple related purchase options. CPE 104 may receive an input related to one or more of the multiple purchasable assets and an associated purchase option via remote control device 110. CPE 104 can send a request to server system 118 that is related to the input.

Figure 2:
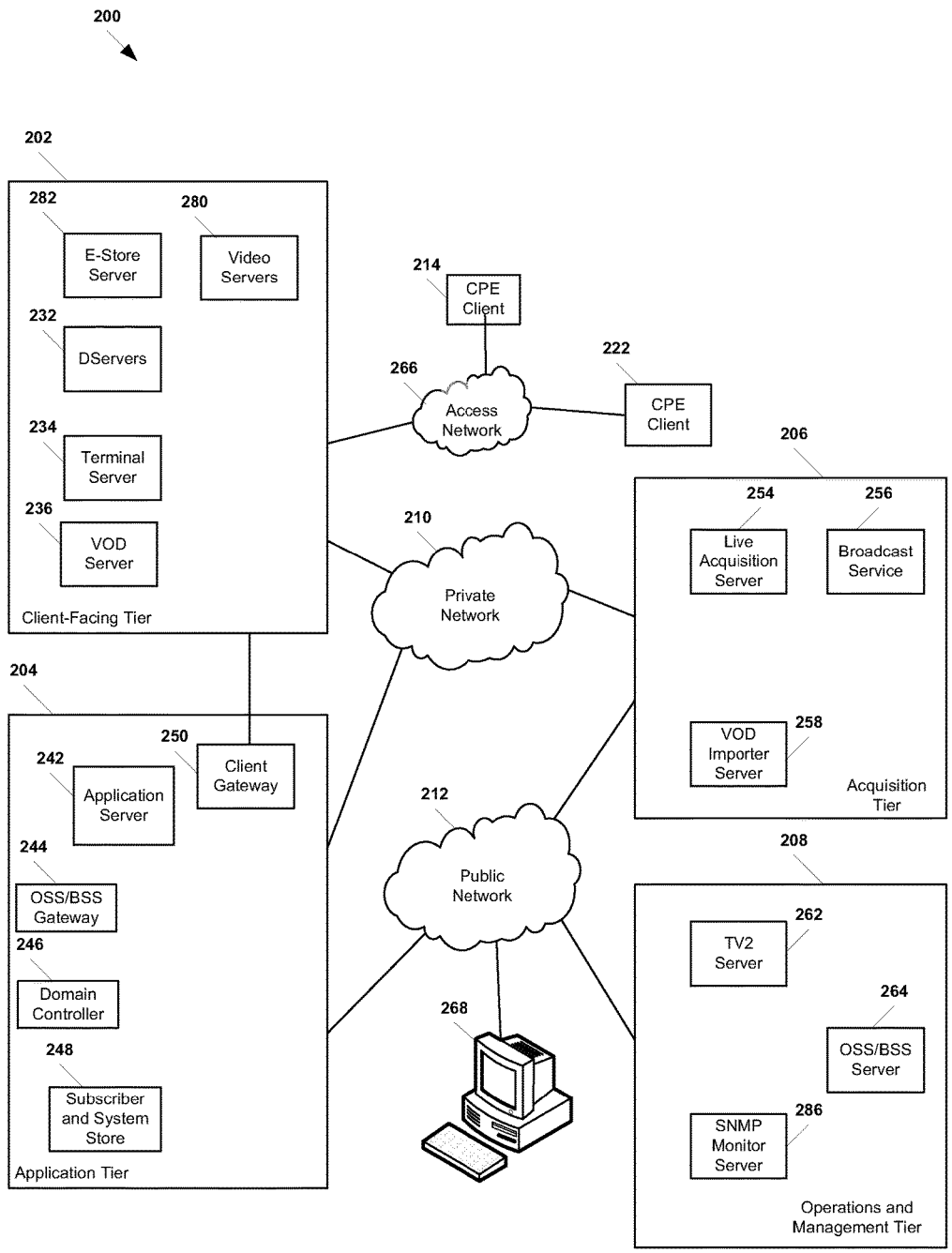
FIG. 2 is a block diagram of selected elements of an embodiment of an MCDN.

FIG. 2 is a block diagram of an illustrative embodiment of MCDN system 200 that may be used to present assets related to multimedia content. Although multimedia content is not limited to TV, VOD, or pay-per-view (PPV) programs, the depicted embodiments of MCDN system 200 and its capabilities are primarily described herein with reference to these types of multimedia content, which are interchangeably referred to herein as "multimedia content", "multimedia content programs", "multimedia programs" or, simply, "programs."

The elements of MCDN system 200 illustrated in FIG. 2 depict network embodiments with functionality for delivering multimedia content to a set of one or more users. It is noted that different embodiments of MCDN system 200 may include additional elements or systems (not shown in FIG. 2 for clarity) as desired for additional functionality, such as data processing systems for billing, content management, customer support, operational support, or other business applications. It is further noted that elements of system 200 may be included within the analogous elements of system 100 illustrated in FIG. 1.

As shown, system 200 can include client-facing tier 202, application tier 204, acquisition tier 206, and operations and management tier 208. Each tier 202, 204, 206, 208 is coupled to private network 210; to public network 212, such as the Internet; or to both private network 210 and public network 212. For example, client-facing tier 202 can be coupled to the private network 210. Further, application tier 204 can be coupled to private network 210 and to public network 212. Acquisition tier 206 can also be coupled to private network 210 and to public network 212. Additionally, operations and management tier 208 can be coupled to public network 212.

As illustrated in FIG. 2, the various tiers 202, 204, 206, 208 communicate with each other via private network 210 and the public network 212. For instance, client-facing tier 202 can communicate with application tier 204 and acquisition tier 206 via private network 210. Application tier 204 can communicate with acquisition tier 206 via private network 210. Further, application tier 204 can communicate with acquisition tier 206 and operations and management tier 208 via public network 212. Moreover, acquisition tier 206 can communicate with operations and management tier 208 via public network 212. In a particular embodiment, elements of application tier 204, including, but not limited to, client gateway 250, can communicate directly with client-facing tier 202.

Client-facing tier 202 can communicate with user equipment via access network 266. In an illustrative embodiment, CPE clients 214, 222 can be coupled to a local switch, router, or other device of the access network 266. Client-facing tier 202 may communicate with a first representative STB device via first CPE client 214 and with a second representative STB device via second CPE client 222 (STB devices not explicitly shown in FIG. 2). In a particular embodiment, first CPE client 214 can be located at a first customer premise, and second CPE client 222 can be located at a second customer premise. In another particular embodiment, the first representative STB device and the second representative STB device can be located at a single customer premise, both coupled to one of CPE clients 214, 222. CPE clients 214, 222 can include routers, local area network devices, modems, such as digital subscriber line (DSL) modems, any other suitable devices for facilitating communication between an STB device and access network 266, or any combination thereof.

In an exemplary embodiment, client-facing tier 202 can be coupled to CPE clients 214, 222 via fiber optic cables. In another exemplary embodiment, CPE clients 214, 222 can include DSL modems that are coupled to one or more network nodes via twisted pairs, and client-facing tier 202 can be coupled to the network nodes via fiber-optic cables. CPE clients 214, 222 may be configured to process data received via the access network 266, such as multimedia content provided by elements of MCDN system 200.

CPE clients 214, 222 can include MCDN STB devices; video gaming devices or consoles that are adapted to receive MCDN content; personal computers (PCs) or other computing devices that are adapted to emulate STB device functionalities; any other device adapted to receive MCDN content and transmit data to an MCDN system via an access network; or any combination thereof.

In an exemplary, non-limiting embodiment, CPE clients 214, 222 can receive data, video, or any combination thereof, from client-facing tier 202 via access network 266 and render or display the data, video, or any combination thereof, at a display device to which it is coupled. In an illustrative embodiment, CPE clients 214, 222 can include tuners that receive and decode television programming signals or packet streams for transmission to display devices, such as TV monitors. Further, CPE clients 214, 222 may include a processor and a memory device (not shown in FIG. 2) that is accessible to the processor. In one embodiment, the memory device may store executable instructions, such as embodied by a computer program.

In an illustrative embodiment, client-facing tier 202 may include a means for communicating between client-facing tier 202 and access network 266 and between client-facing tier 202 and private network 210. In one example, the communication means in client-facing tier 202 may be a network switch or sub-system (not shown in FIG. 2) that is coupled to one or more data servers, such as D-servers 232, that store, format, encode, replicate, or otherwise manipulate or prepare video content for communication from client-facing tier 202 to CPE clients 214, 222. The communication means in client-facing tier 202 can also be coupled to terminal server 234 that provides terminal devices with a point of connection to MCDN system 200 via client-facing tier 202. In a particular embodiment, communication means in client-facing tier 202 can be coupled to VOD server 236 that stores or provides VOD content imported by MCDN system 200. Further, the communication means in client-facing tier 202 may be coupled to one or more video servers 280 that receive video content and transmit the content to CPE clients 214, 222 via access network 266. The communication means in client-facing tier 202 can also be coupled to electronic store server 282 that stores and provides data related to purchasable assets to user devices, such as CPE clients 214, 222.

In an illustrative embodiment, client-facing tier 202 can communicate with a large number of clients, such as representative CPE clients 214, 222, over a wide geographic area, such as a metropolitan area, a viewing area, a statewide area, a regional area, a nationwide area or any other suitable geographic area, market area, or subscriber or customer group that can be supported by networking client-facing tier 202 to numerous CPE clients. In a particular embodiment, the communication means in client-facing tier 202, or any portion thereof, can include a multicast router or switch that communicates with multiple CPE clients via a multicast-enabled network.

As illustrated in FIG. 2, application tier 204 can communicate with both private network 210 and public network 212. Application tier 204 can include a means for communicating that can be coupled to application server 242 and to operations systems and support/billing systems and support (OSS/BSS) gateway 244. In a particular embodiment, application server 242 can provide applications to CPE clients 214, 222 via access network 266, which enable CPE clients 214, 222 to provide functions, such as interactive program guides, video gaming, display, messaging, processing of VOD material and other MCDN multimedia content, etc. In an illustrative embodiment, application server 242 can provide location information to CPE clients 214, 222. In a particular embodiment, OSS/BSS gateway 244 includes OSS data, as well as BSS data. In one embodiment, OSS/

BSS gateway 244 can provide or restrict access to OSS/BSS server 264 that stores operations and billing systems data.

The means for communicating in application tier 204 can be coupled to domain controller 246 that provides Internet access, for example, to users at their computers 268 via the public network 212. For example, domain controller 246 can provide remote Internet access to IPTV account information, e-mail, personalized Internet services, or other online services via public network 212. In addition, the means for communicating in application tier 204 can be coupled to subscriber and system store 248 that includes account information, such as account information that is associated with users who access MCDN system 200 via private network 210 or public network 212. In an illustrative embodiment, subscriber and system store 248 can store subscriber or customer data and create subscriber or customer profiles that are associated with IP addresses, stock-keeping unit (SKU) numbers, other identifiers, or any combination thereof, of corresponding CPE clients 214, 222. In another illustrative embodiment, the subscriber and system store can store data associated with capabilities of STB devices associated with particular customers.

In a particular embodiment, application tier 204 can include client gateway 250 that communicates data directly to client-facing tier 202. In this embodiment, client gateway 250 can be coupled directly to client-facing tier 202. Client gateway 250 can provide user access to private network 210 and other tiers coupled thereto. In an illustrative embodiment, CPE clients 214, 222 can access MCDN system 200 via access network 266, using information received from client gateway 250. User devices can access client gateway 250 via access network 266, and client gateway 250 can allow such devices to access private network 210 once the devices are authenticated or verified. Similarly, client gateway 250 can prevent unauthorized devices, such as hacker computers or stolen CPE from accessing private network 210, by denying access to these devices beyond access network 266.

For example, when a first representative CPE client 214 accesses client-facing tier 202 via access network 266, client gateway 250 can verify subscriber information by communicating with subscriber and system store 248 via private network 210. Further, client gateway 250 can verify billing information and status by communicating with OSS/BSS gateway 244 via private network 210. In one embodiment, OSS/BSS gateway 244 can transmit a query via public network 212 to OSS/BSS server 264. After client gateway 250 confirms subscriber and/or billing information, client gateway 250 can allow CPE client 214 to access MCDN content and VOD content at client-facing tier 202. If client gateway 250 cannot verify subscriber information for CPE client 214, e.g., because it is connected to an unauthorized twisted pair, client gateway 250 can block transmissions to and from CPE client 214 beyond access network 266.

In FIG. 2, acquisition tier 206 may include a means for communication (not shown in FIG. 2) with private network 210, that can also communicate with operations and management tier 208 via public network 212. In a particular embodiment, the communication means in acquisition tier 206 can be coupled to live acquisition server 254 that receives or acquires television content, movie content, advertisement content, other video content, or any combination thereof, from broadcast service 256, such as a satellite acquisition system or satellite head-end office. In a particular embodiment, live acquisition server 254 can transmit content to the communication means in acquisition tier 206, which can transmit the content to client-facing tier 202 via private network 210.

In an illustrative embodiment, multimedia content can be transmitted to D-servers 232, where it can be encoded, formatted, stored, replicated, or otherwise manipulated and prepared for communication from video server(s) 280 to CPE clients 214, 222. Client-facing tier 202 can receive content from video server(s) 280 and communicate the content to CPE 214, 222 via access network 266. STB devices can receive the content via CPE 214, 222, and can transmit multimedia content to television monitors (not shown in FIG. 2). In an illustrative embodiment, video or audio portions of the multimedia content can be streamed to CPE clients 214, 222.

Further, acquisition tier 206 can be coupled to a VOD importer server 258 that receives and stores television or movie content received at acquisition tier 206 and communicates the stored content to VOD server 236 at client-facing tier 202 via private network 210. Additionally, at acquisition tier 206, VOD importer server 258 can receive content from one or more VOD sources outside MCDN system 200, such as movie studios and programmers of non-live content. VOD importer server 258 can transmit the VOD content to acquisition tier 206, which can communicate the material to client-facing tier 202 via private network 210. The VOD content can be stored at one or more servers, such as VOD server 236.

When users issue requests for VOD content via CPE clients 214, 222, the requests can be transmitted over access network 266 to VOD server 236, via client-facing tier 202. Upon receiving such requests, VOD server 236 can retrieve the requested VOD content and transmit the content to CPE clients 214, 222 across access network 266. In an illustrative embodiment, video or audio portions of VOD content can be streamed to CPE clients 214, 222.

In FIG. 2, operations and management tier 208 can include a means for communication (not shown in FIG. 2) that conducts communication between operations and management tier 208 and public network 212. The communication means in operations and management tier 208 may be coupled to TV2 server 262. Additionally, communication means in operations and management tier 208 can be coupled to OSS/BSS server 264 and to simple network management protocol (SNMP) monitor server 286 that monitors network devices within or coupled to MCDN system 200. In a particular embodiment, the communication means in operations and management tier 208 can communicate with acquisition tier 206 via public network 212.

In an illustrative embodiment, live acquisition server 254 can transmit content to acquisition tier 206, which can transmit the content to operations and management tier 208 via public network 212. In this embodiment, the operations and management tier 208 can transmit the content to TV2 server 262 for display to users accessing the user interface at TV2 server 262. For example, a user can access TV2 server 262 using personal computer 268 coupled to public network 212.

In a particular illustrative embodiment, client-facing tier 202 can provide media content, such as video content, to CPE client 214. The media content can include a selectable trigger, which may be provided by CPE client 214 to a display device as a popup within a video display. Client-facing tier 202 may receive data related to selection of the selectable trigger. In response to receiving the data, electronic store server 282 may provide a GUI including an electronic storefront to CPE client 214 for display at a display device, such as a TV monitor (not shown in FIG. 2). The electronic storefront can include data related to multiple purchasable assets as well as multiple options for purchasing one or more of the assets.

In another particular illustrative embodiment, CPE client 214 receives media content including an embedded trigger. CPE client 214 identifies the embedded trigger and provides a popup to a TV monitor that is related to the embedded trigger. The popup can include information related to a particular promotion and an invitation to access an electronic storefront. A user may utilize a remote control device to request the electronic storefront. CPE client 214 may receive an input from the remote control device and transmit a request to client-facing tier 202 for the electronic storefront. The request may include an identifier related to the selected media content, an identifier related to CPE client 214, an account identifier associated with CPE client 214, an identifier associated with the electronic storefront, or any combination thereof. In a particular embodiment, in response to sending the request, CPE client 214 may receive a GUI that includes an electronic storefront that has multiple purchasable assets and multiple selectable payment options. CPE client 214 may provide the GUI to TV monitor, not depicted. In one embodiment, CPE client 214 can receive data that can be executed by a processor to generate a GUI that includes an electronic storefront that has multiple purchasable assets and multiple selectable payment options. CPE client 214 can provide the generated GUI to a display device for display. A user may utilize a remote control device to purchase one or more assets and to select a payment option related to the purchase. CPE client 214 may send an asset identifier and purchase information to E-store server 282 for fulfillment.

Figure 3:
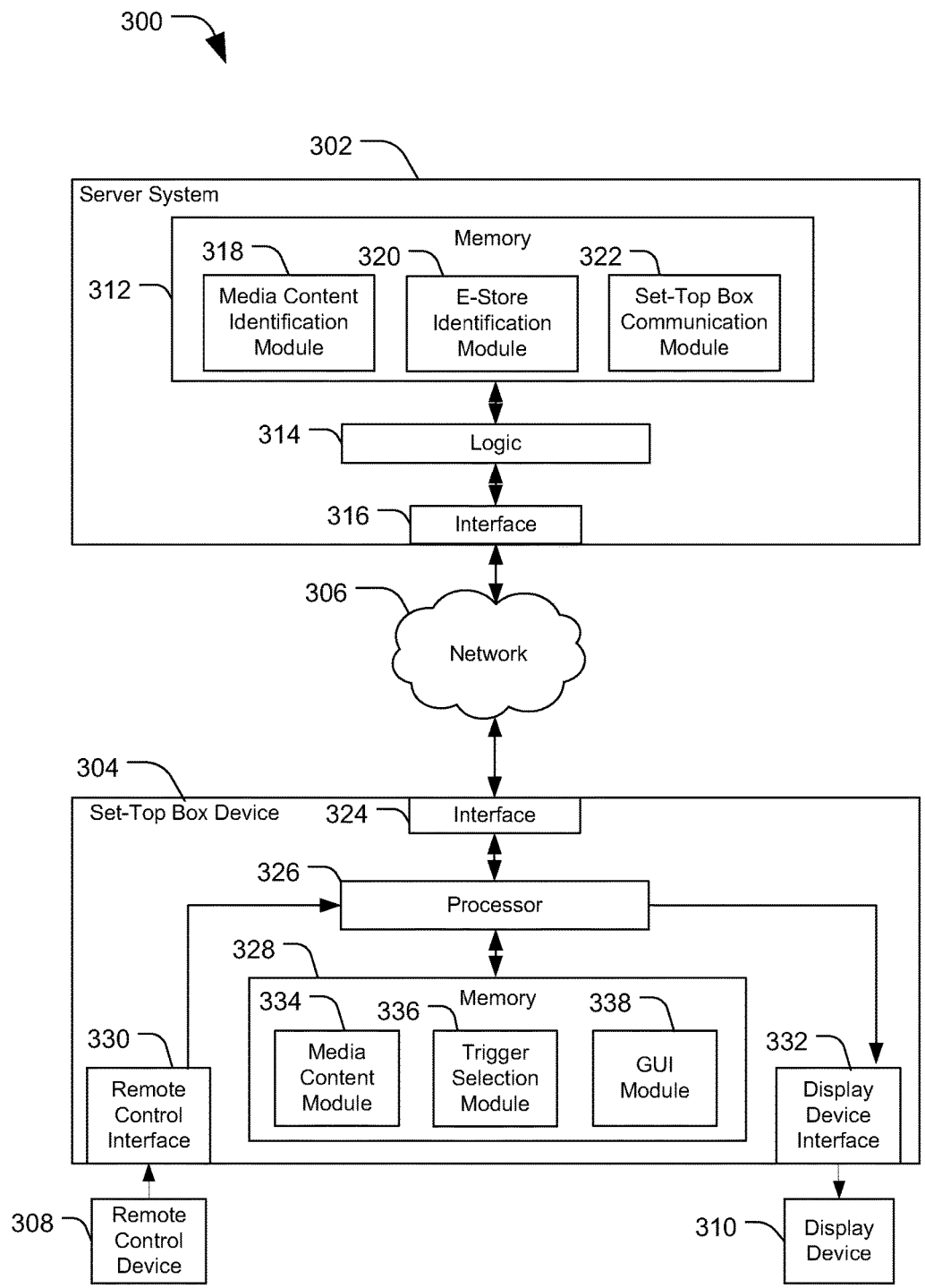
FIG. 3 is a block diagram of selected elements of an embodiment of an MCDN.

FIG. 3 is a block diagram of a third particular illustrative embodiment of system 300 to present assets related to media content. It is noted that elements of system 300 may be included within analogous elements of system 100 and of system 200 illustrated in FIGS. 1 and 2, respectively. System 300 includes server system 302 that communicates with CPE at a client system, represented in FIG. 3 by STB device 304, via network 306, which may be the public Internet or an MCDN. Server system 302 includes interface 316 to network 306, processing logic 314 and memory 312 that is accessible to processing logic 314.

In a particular embodiment, memory 312 includes media content identification module 318 that can be executed by processing logic 314 to identify media content received at STB device 304. Media content identification module 318 may also be used to transmit media content to STB device 304. The media content may include an embedded selectable trigger, which can be executed at STB device 304 to generate a popup within the video at display device 310. Memory 312 may also include electronic store (e-store) identification module 320 that can be executed by processing logic 314 to identify assets. E-store identification module 320 may also be executed by processing logic 314 to generate an electronic storefront, including a GUI presenting the identified assets. Memory 312 may also include STB communication module 322 that can be executed by processing logic 314 to communicate with STB device 304 to receive requests for an electronic storefront related to media content and to communicate the generated electronic storefront to STB device 304. In a particular illustrative embodiment, STB communication module 322 may also receive data related to purchase orders and payment option selections from STB device 304.

STB device 304 may include interface 324 to network 306. STB device 304 may also include processor 326 coupled to interface 324 and memory 328 that is accessible to processor 326. STB device 304 may also include remote control interface 330 that communicates with remote control device 308 and display device interface 332 that communicates with display device 310. In a particular embodiment, memory 328 includes media content module 334 that is executable by processor 326 to receive media content from server system 302 (or from another content source) via network 306. Memory 328 may include trigger selection module 336 that is executable by processor 326 to identify an embedded selectable trigger within the media content and to generate a selectable popup within the video at the display device based on the embedded trigger. Trigger selection module 336 may also be executed by processor 326 to receive a selection related to the selectable popup via remote control device 308 and to communicate data related to the selection to server system 302 via the network. Memory 328 may also include GUI module 338 that is executable by processor 326 to receive instructions related to an electronic storefront and to generate a GUI that can be provided to display device 310 that includes one or more selectable indicators related to purchasable assets.

In a particular illustrative embodiment, e-store identification module 320 may be executed to select an electronic storefront from a plurality of stored electronic storefronts based on media content received at STB device 304. In another particular illustrative embodiment, e-store identification module 320 can be executed to generate the electronic storefront dynamically, such that the GUI includes an electronic storefront having a first selectable element related to a first asset and a second selectable element related to a second asset (both selected based on the media content). The GUI can also include multiple payment options that are related to a first selectable element and a second selectable element. In a particular illustrative embodiment, the multiple payment options can include an electronic coupon payment option, account billing option to bill a subscriber account associated with the destination device (i.e., the STB device), a credit card option, a debit card option, other payment options, or any combination thereof.

In a particular illustrative embodiment, the STB device 304 receives media content including an embedded trigger from server system 302. STB device 304 identifies the embedded trigger and provides the media content and a popup based on the embedded trigger to display device 310. STB device 304 receives an input from remote control device 308 that is related to the popup. STB device 304 sends a request to server system 302 based on the input. The request may include an identifier related to the media content, an identifier associated with STB device 304, a subscriber account identifier, an electronic storefront identifier, other information, or any combination thereof. STB device 304 receives data related to an electronic storefront based on the request, and provides a user interface to display device 310 that includes the electronic storefront. The electronic storefront includes one or more selectable indicators related to purchasable assets. The electronic storefront also includes one or more payment options for purchasing selected assets. STB 304 receives a selection of at least one indicator and a selected payment option and sends data related to the selection and the selected payment option to server system 302 to complete a purchase transaction.

In a particular embodiment, if the purchased asset is an electronic asset, server system 302 may provide instructions for downloading the asset, may send the purchased asset, may perform other actions, or any combination thereof. If the purchased asset is a tangible object, server system 302 may transmit a purchase order fulfillment request to a fulfillment center (not shown) to complete the packaging and shipping of the purchased asset. Server system 302 may also notify an inventory system (not shown) to update inventory data based on the purchase.

Figure 4:
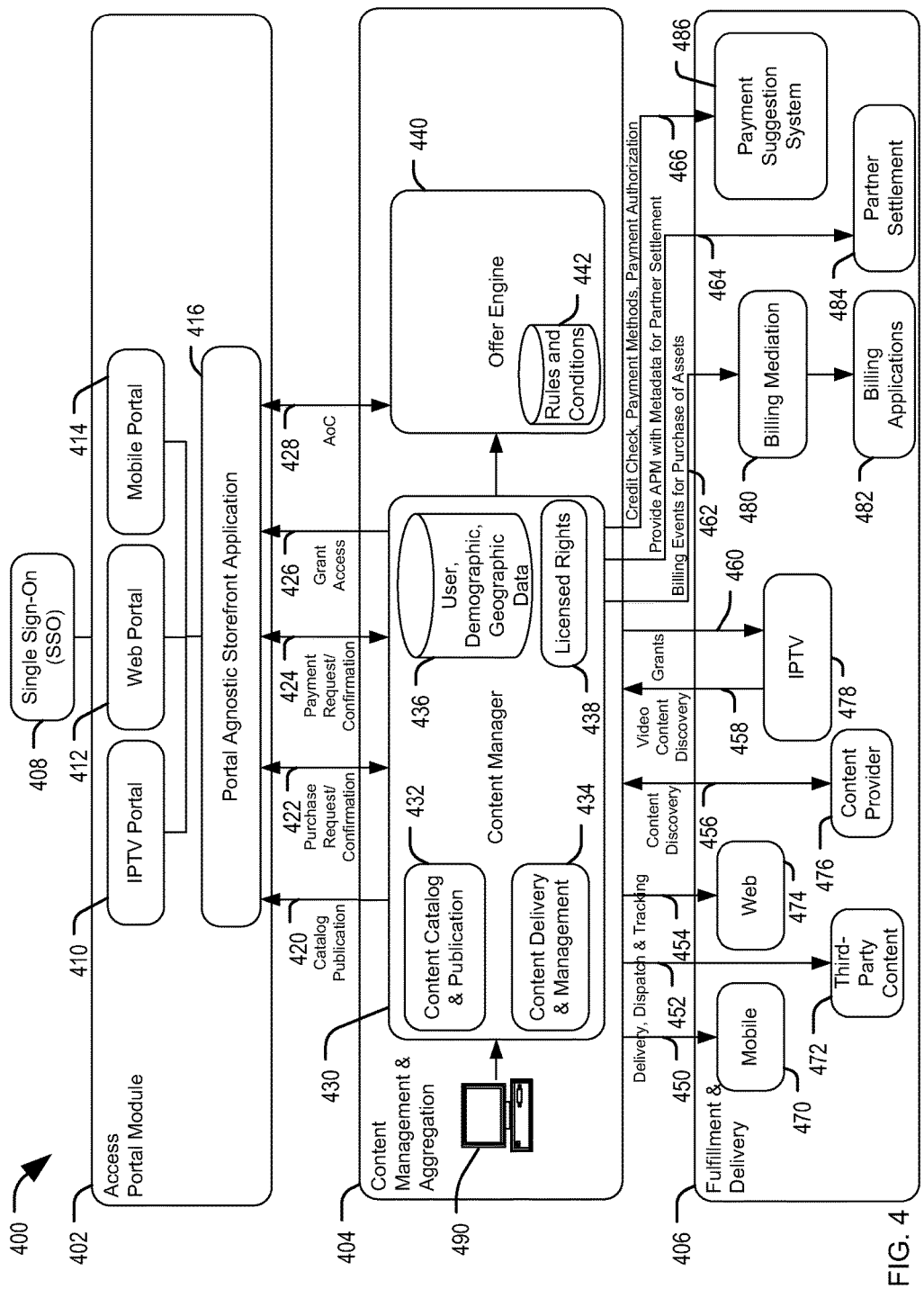
FIG. 4 is a block diagram of selected elements of an embodiment of an MCDN.

FIG. 4 is a block diagram of an illustrative embodiment of system 400 to present assets related to media content. System 400 may include single sign on (SSO) interface 408 to communicate with one or more of a plurality of access points at access portal module 402. The access points may include representative access points, such as IPTV portal 410, web portal 412, and mobile portal 414. Access portal module 402 also includes portal agnostic storefront application 416. Portal agnostic (also referred to herein as "unified" or "USF application") storefront application 416 may send data related to a storefront display via the various access portals 410, 412, 414 to a user device that is signed on via SSO interface 408.

System 400 also includes content management and aggregation module 404 having content manager 430, offer engine 440 and administration device 490. Administration device 490 may communicate with content management and aggregation module 404, fulfillment and delivery module 406, and access portal module 402 to allow administrative configuration of each module. For example, administration device 490 may be used to establish offer management rules stored at rules and conditions database 442. In another example, administration device 490 may be used to configure a storefront display provided via access portal module 402. In another example, administration device 490 may be used to configure fulfillment and delivery module 406.

In a particular embodiment, content manager 430 includes content catalog and publication module 432, which may identify assets that are available to be offered for sale. For example, content delivery and management module 434 may query content providers, such as content providers 476, to identify assets that are available for purchase. Catalog and publication module 432 may process data received from content providers 476 to identify metadata related to available assets, such as a description of the content of an asset, a format of the asset, a type of the asset, a cost of the asset, other information about the asset, or any combination thereof. Catalog and publication module 432 may provide catalog publication output 420 to portal agnostic storefront application 416 identifying the available assets. Catalog and publication module 432 may also provide information identifying the available assets to offer engine 440 to allow offer rules related to the assets to be configured.

In a particular embodiment, content manager 430 may also include content delivery and management module 434. Content delivery and management module 434 may manage delivery of purchased assets to user devices. For example, content delivery and management module 434 may receive payment information for the purchase of an asset via portal agnostic storefront application 416. Content delivery and management module 434 may send an access grant message to a content provider after payment for an asset has been received and approved. The grant message may authorize the content provider to send the content of the purchased asset to the purchasing user device or another user device.

In a particular embodiment, content manager 430 may also include user database 436. User database 436 may include user data, such as demographic information and geographic information. User database 436 may be utilized to establish promotional offers, to identify subscribers to which promotional offers should be made, to implement offer rules, and so forth. For example, offer engine 440 may access user database 436 in order to determine whether a particular offer applies to a particular subscriber based on the subscriber data.

In a particular embodiment, content manager 430 may also include license rights module 438. License rights module 438 may implement rules to ensure the license rights associated with digital assets are complied with. For example, license rights module 438 may ensure that royalties associated with digital assets are paid. In another example, license rights module 438 may determine an amount owed to a content provider or third party resulting from the purchase of a digital asset.

In a particular embodiment, fulfillment and delivery module 406 may include a variety of fulfillment modules including mobile module 470, third party content module 472, web module 474, dedicated content provider module 476 and IPTV module 478. Fulfillment modules 470, 472, 474, 476 and 478 provide data identifying assets available for purchase to content manager 430. In a particular embodiment, fulfillment modules 470, 472, 474, 476 and 478 may also send data including the content of a purchased asset to a user device.

In a particular embodiment, fulfillment and delivery module 406 may include one or more transaction application modules, such as billing mediation module 480, billing applications module 482, partner settlement module 484, and payment suggestion system 486. Billing mediation module 480 may receive data related to the purchase of assets, e.g., billing events data, from content manager 430 and may determine a charge for the purchase based on the data. Billing mediation module 480 may pass data related to the purchase to billing applications module 482. Billing applications module 482 may prepare a bill to charge a subscriber for the purchase of an asset. For example, billing applications module 482 may add the charge to a unified subscriber bill for communication services, such as wireless telephone service, telephone service, television service (e.g., IPTV service), Internet access service, other communication services, or any combination thereof.

In a particular embodiment, partner settlement module 484 may receive information associated with the purchase of an asset from content manager 430. Partner settlement module 484 may process the purchase information to determine an amount owed to another party, such as a content provider, license rights holder, fulfillment agent, or other party as a result of the purchase. Partner settlement module 484 may execute payment of the owed amount or pass information related to the owed amount to a payment system.

In a particular embodiment, payment suggestion system 486 may also receive data from content manager 430 related to the purchase of an asset. The purchase information may include a purchase price and information about the user. Payment suggestion system 486 may determine available payment options for the user, such as a charge to the user's account (e.g., a communication services account), payment by credit card, payment by electronic funds transfer, other payment options, or any combination thereof.

Content management and aggregation module 404 may communicate with fulfillment and delivery module 406 via a plurality of communication links. Representative examples of the communication links may include delivery, dispatch and tracking communication links 450, 452, 454, content discovery communication link 456, video content discovery link 458, and IPTV access grant communication link 460. In addition, content management and aggregation module 404 may communicate with the transaction application modules of fulfillment and delivery module 406 via billing event communication link 462, partner settlement communication link 464 and credit check and payment authorization communication link 466.

Content manager 430 may communicate with portal agnostic storefront application 416 via a plurality of communication links 420, 422, 424, 426 and 428. Representative examples of the communication links may include catalog publication communication link 420 to provide information about available assets, purchase request/confirmation communication link 422 to communicate purchase and purchase confirmation information, grant access communication link 426 to communicate access grants, and payment request confirmation communication link 424 to communicate payment request and payment confirmation information. In addition, offer engine 440 may communicate with portal agnostic storefront application 416, for example, via advice of change (AOC) communication link 428.

During operation of a particular embodiment, content manager 430 may prepare a catalog of assets available for purchase and provide the catalog of assets to administration device 490 for configuration of offer rules and conditions related to the assets. Offer engine 440 may implement the offer rules and conditions to promote the assets in the catalog via a storefront display sent to user devices via portal agnostic storefront application 416. Content manager 430 may receive requests for purchase of such assets via portal agnostic (i.e., unified) storefront application 416. Offer engine 440 may provide an AOC to the subscriber associated with the purchase via portal agnostic storefront application 416. If the subscriber approves the charge, content manager 430 may send payment information to transaction application modules 480, 482, 484, 486 and may communicate with fulfillment and delivery module 406 in order to fulfill the purchase.

In a particular embodiment, after purchase of the asset, portal agnostic storefront application 416 may provide the content of the electronic asset via a suitable interface based on the asset type. For example, an IPTV-related asset may be provided via IPTV portal 410, an Internet asset may be available via web portal 412, and a mobile asset may be available via mobile portal 414. In certain embodiments, electronic assets may be offered and/or made available by at least one of IPTV portal 410, web portal 412, and mobile portal 414. That is, the same electronic asset may be made available via different portals 410, 412, 414. Additionally, content manager 430 may interact with fulfillment and delivery module 406 to provide billing information necessary to bill the subscriber for the asset purchase and to pay content providers or other third parties for the transaction.

Figure 5:
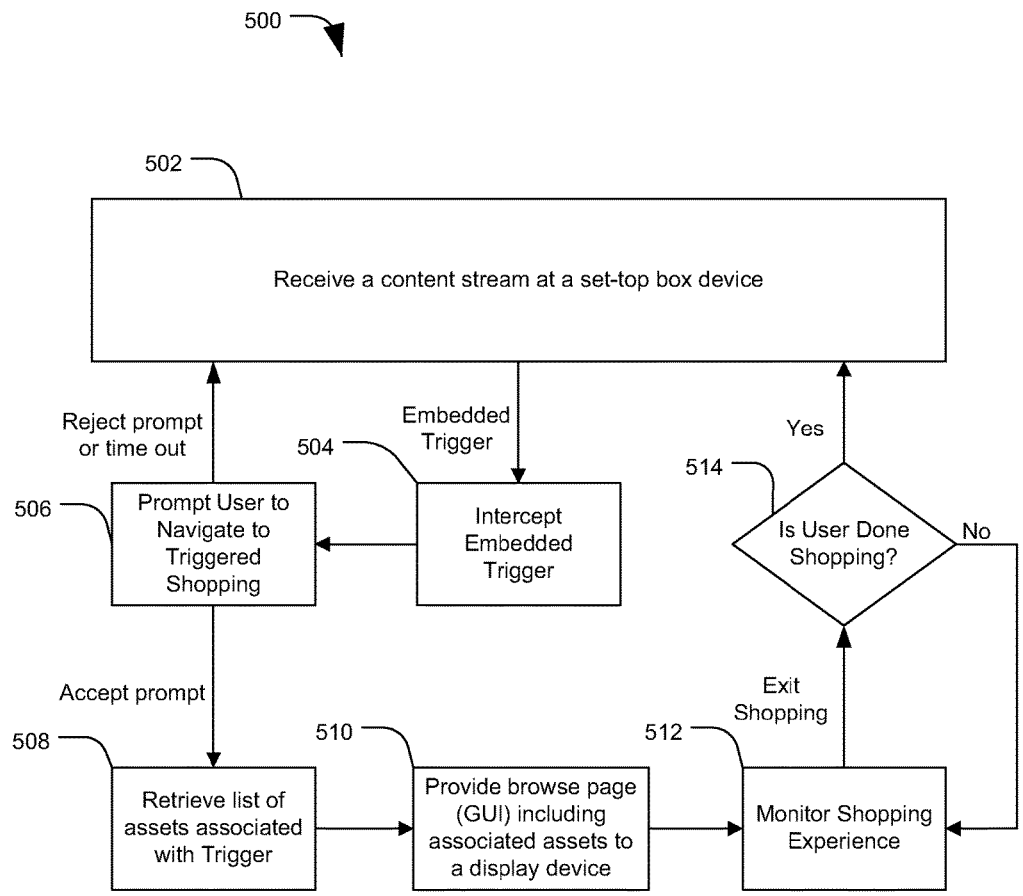
FIG. 5 is an embodiment of a method for presenting assets related to multimedia content.

FIG. 5 is a flow diagram of a particular illustrative embodiment of method 500 for presenting assets related to media content. A content stream may be received at an STB device (operation 502). The STB device may intercept an embedded trigger (operation 504). The STB device may prompt a user to navigate to an electronic storefront, also known as triggered shopping (operation 506). If the user does not respond (i.e., a time out occurs) or if the user rejects the prompt, the method may return to operation 502. If the user accepts the prompt, the STB device may retrieve a list of assets associated with the trigger (operation 508). The STB device may provide a browse page (GUI) including the associated assets to a display device (operation 510). The STB device may monitor the shopping experience (operation 512). A decision may be made by the STB device if the user is done shopping (operation 514). If the result of the decision is NO, the method may return to operation 512 and the STB device may continue to monitor the shopping experience. If the result of the decision is YES, the customer is done shopping, the method may advance to operation 502.

Figure 6:
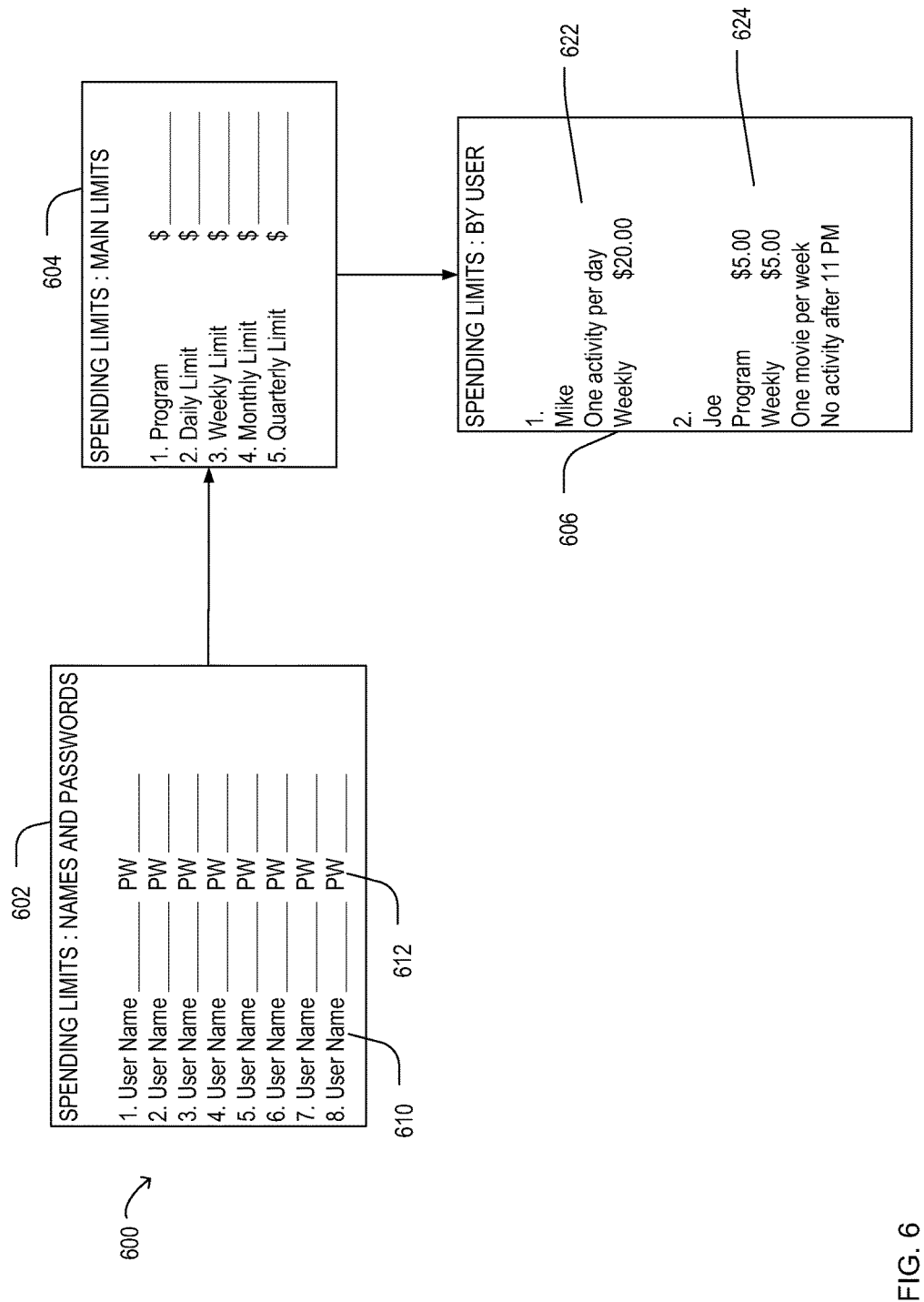
FIG. 6 is a block diagram of selected elements of an embodiment of a spending limit profile.

FIG. 6 is a block diagram of an illustrative embodiment of spending limit profile 600, which includes spending limit information. Spending limit profile 600 is representative for a data structure that may be stored and used to limit spending of multimedia content obtained from an MCDN, as described above. Information to complete spending limit profile 600 may be received from a user of CPE in an MCDN client configuration and may be stored on an MCDN server. Spending limit profile 600 may be entered by a user of a USF application to limit spending on an MCDN user account associated with the user. The MCDN user account may also be used to create and administer sub-accounts, which may be individually limited using spending limit profile 600, as will be described below.

In general, spending limit profile 600 may include specific criteria for limiting purchase amounts for multimedia content. The criteria may be related to various parameters and methods for limiting spending. In one example, the spending limit criteria indicate a period of time over which a certain amount may be cumulatively charged, but not exceeded. The time period may be daily, weekly, monthly, quarterly, or another period, such as an arbitrary period. In other instances, spending limits may be based on individual sub-accounts, such that the user specified in the sub-account may be given a certain credit for purchases, which cannot be exceeded. In other instances, a number of obtained multimedia programs, or a price for individual programs, may act as a limiting criteria. In still further examples, a daily time period for viewing may limit access to multimedia content. In certain embodiments, spending limit profile 600 may include restrictions for accessing multimedia programs that are not related with spending limits, such as programs provided without additional cost under the MCDN user account.

In practice, a spending limit, such as defined by spending limit profile 600, may be applied at the moment a multimedia program is requested by a user. The user may enter a user name and a password registered for the MCDN user account, or for an associated sub-account. The request may be compared to the user's spending limits. In case the request, if allowed, would exceed the spending limit, the request may be denied. In case the request, if allowed, would not exceed the spending limit, the request may be allowed, and the user may obtain the multimedia program for viewing. Accordingly, spending limit profile 600 may be used to restrict requests for multimedia programs.

In FIG. 6, spending limit profile 600 includes a collection 602 of user names 610 and passwords 612. In certain embodiments, collection 602 may be stored as a table, for example, in a database format. The first user name and password in collection 602 may designate the MCDN user account (e.g., the main MCDN account), while subsequent entries may denote sub-accounts. User names 610 and passwords 612 may be used in response to a request for multimedia content for which spending limits have been activated on the MCDN user account. Upon requesting multimedia content, the user may be requested for a user name and password, which may be matched by the corresponding entries in collection 602. A match may be used to apply the corresponding spending limits for the identified user in spending limit profile 600. In particular embodiments, a user name and password may be configured to override spending limits, and allow access to multimedia content regardless of other criteria in spending limit profile 600.

In FIG. 6, each entry in collection 602 may further be linked to main limits 604. Main limits 604 may include overall spending limits for certain categories of content or periods of time, as shown. In different embodiments, other criteria for main limits 604 may be implemented as desired.

Also shown in FIG. 6 are two examples of sub-accounts with user-specific spending limits 606. In the first sub-account 622, a user "Mike" is allowed a weekly limit of $20.00 to spend using the MCDN user account. In the second sub-account 624, a user "Joe" is allowed a program spending limit of $5.00 per program, and a time duration spending limit of maximum $5.00 per week. Joe is still further restricted to obtaining up to one (1) movie per week, and may not use the sub-account for any activity after 11 PM. As shown by user-specific spending limits 606, any one or more combinations of spending limit criteria, and other criteria, may be defined to restrict access to multimedia content using the MCDN user account or sub-accounts.

Figure 7:
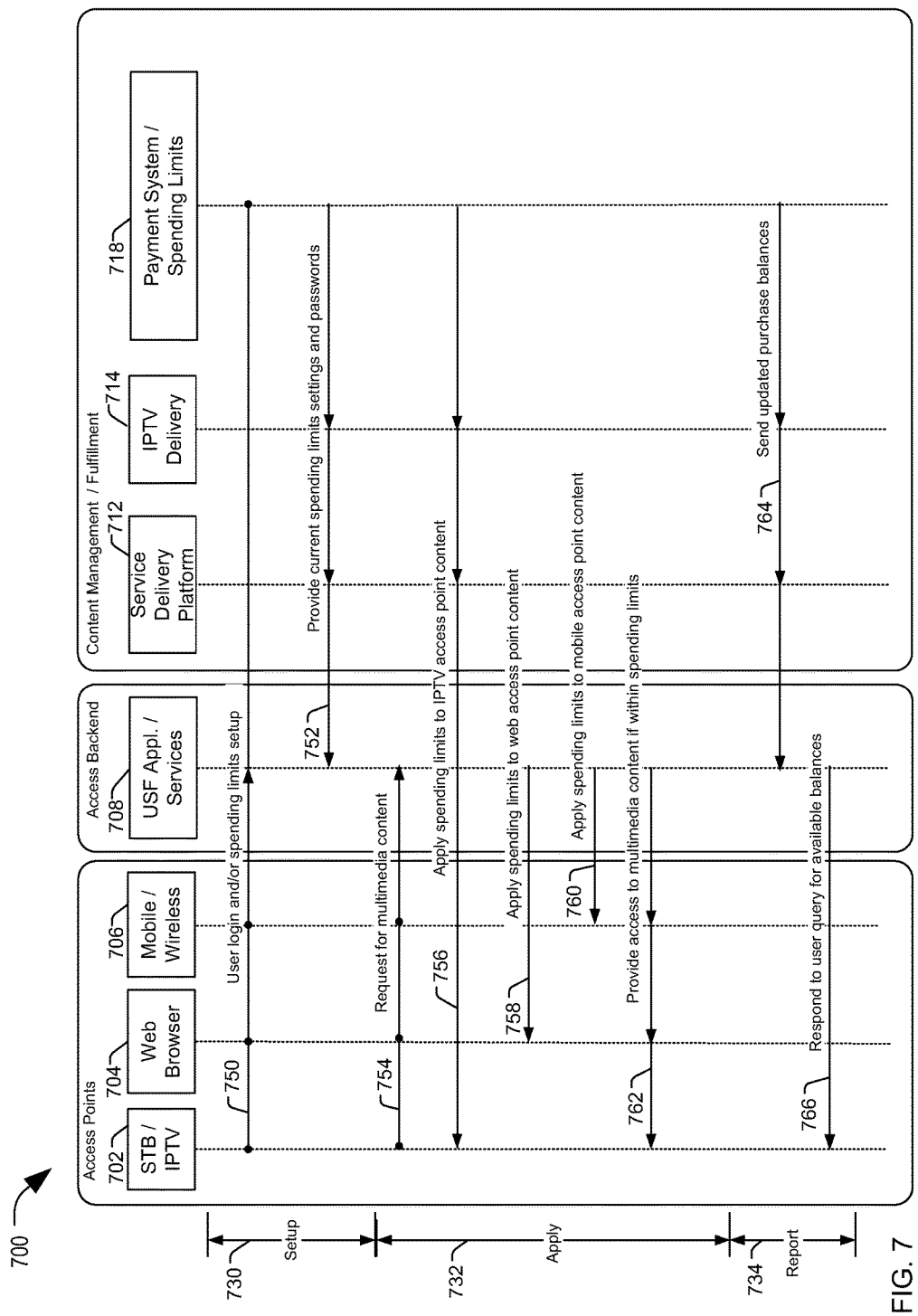
FIG. 7 is an embodiment of a method for applying spending limits related to multimedia content.

Referring to FIG. 7, a ladder diagram of an embodiment of method 700 for applying spending limits to an MCDN account is shown. Method 700 includes various stages including setup stage 730, apply stage 732, and report stage 734.

In connection with setup stage 730, a user may login with the USF application/services 708 to setup spending limits and/or subsequently request multimedia content (see apply stage 732, item 754) as represented by 750. The user may login 750 from any access point, such as STB/IPTV 702, web browser 704, and mobile wireless 706, and provide spending limit information, such as spending limit profile 600 (see FIG. 6). In other words, the user may create spending limit profiles for an MCDN account or for sub-accounts, which may include entering user names and passwords.

In addition, USF application/services 708 may forward the spending limit information to payment system/spending limits 718 in the content management/fulfillment module for storage and maintenance. In situations where spending limits have already been established, payment system/spending limits 718 may forward current spending limit information, including settings and passwords, to IPTV delivery 714 and service delivery platform 712, from where it can be accessed by USF application/services 708, as represented by 752. In this manner, upon user login 750, the user may be presented with existing spending limits for editing or modifying. In some instances, user login and spending limit setup 750 may be used to cancel previously defined spending limits. It is noted that method 700 may provide the ability to enter or modify spending limit information from any access point, such as STB/IPTV 702, web browser 704, and mobile wireless 706.

In connection with apply stage 732, the user may issue a request for multimedia content to USF application/services 708 from any access point STB/IPTV 702, web browser 704, and mobile wireless 706, as represented by 754. Application of spending limits to STB/IPTV access points content 756 may be applied by various methods, depending on the access point used for the request. In the case of content delivery via the MCDN to STB/IPTV 702, payment system/spending limits 718 may send spending limit information to IPTV delivery 714, which feeds service delivery platform 712 with IPTV content. Service delivery platform 712 may then be configured to provide content via the MCDN within available spending limits, and to restrict or deny content that would result in spending limits being exceeded. In the case of accessing content via web browser 704 or mobile wireless 706, USF application/services 708 may apply spending limits to the corresponding access point. Spending limits applied to web browser 704 are represented by 758, while spending limits applied to mobile wireless 706 are represented by 760. In some embodiments, USF application/services 708 may provide access to multimedia content within spending limits via STB/IPTV 702, web browser 704, and mobile wireless 706, as represented by 762.

In connection with report stage 734, payment system/spending limits 718 may send updated purchase balances and other account details to IPTV delivery 714, service delivery platform 712, and USF application/services 708, as represented by 764. The updated purchase balances may be itemized or subtotaled for each sub-account and may be sent along with the current spending limits. USF application/services 708 may further be configured to respond to a user query (not shown) for available balances by generating a corresponding report at STB/IPTV 702, as represented by 766. In some embodiments, a purchase balance report may be sent via another access point, such as web browser 704 or mobile wireless 706 (not shown), or via an external communications channel, such as email, fax, voice message, multimedia message, postal delivery, etc.

Figure 8:
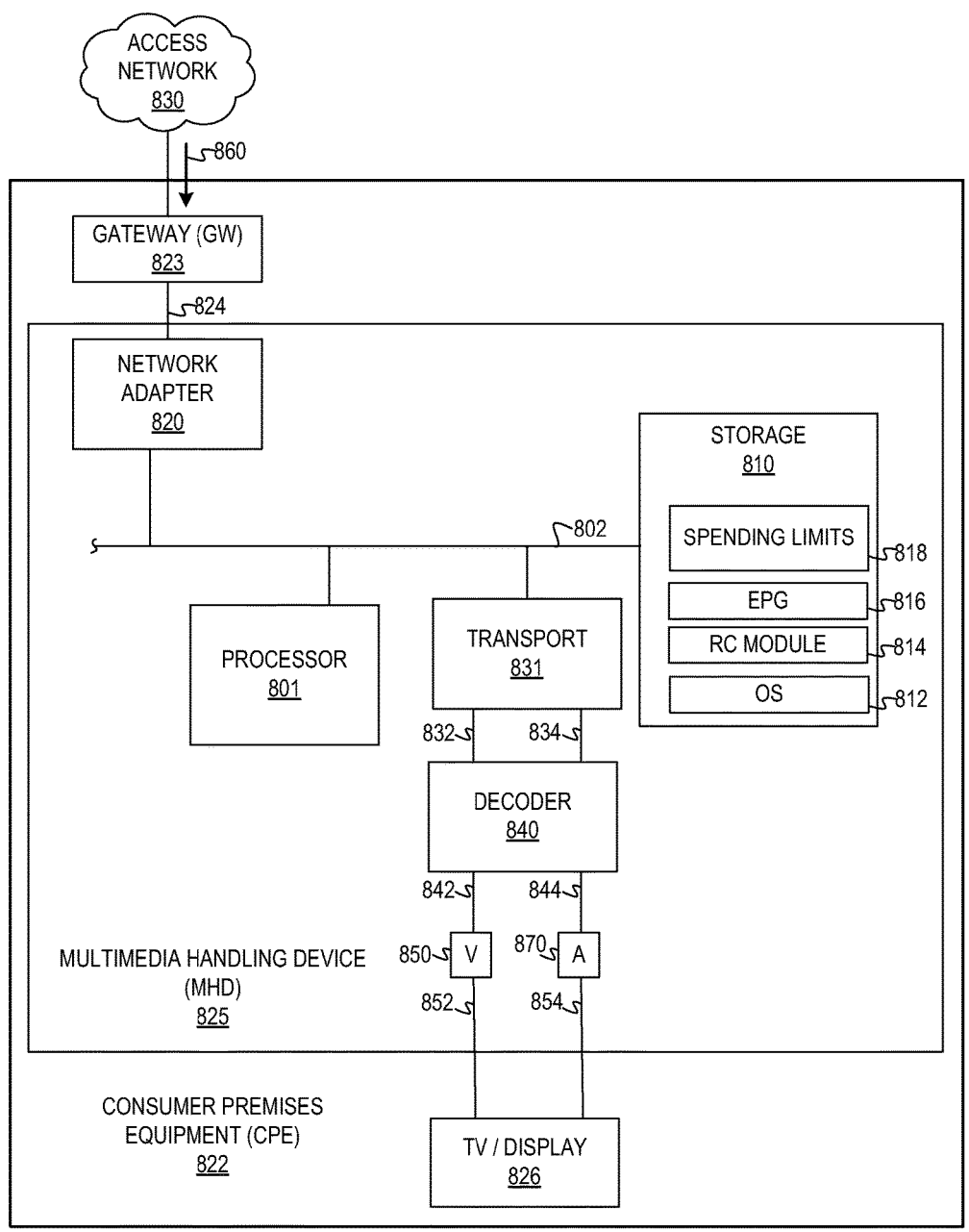
FIG. 8 illustrates an embodiment of a multimedia handling device.

Referring now to FIG. 8, a block diagram illustrating selected elements of an embodiment of multimedia handling device (MHD) 825 is presented. It is noted that elements depicted in FIG. 8 may be included within analogous elements of systems 100, 200, and 300 illustrated in FIGS. 1, 2, and 3, respectively. In FIG. 8, MHD 825 is shown as a functional component of CPE 822 along with gateway (GW) 823 and display 826, independent of any physical implementation. In particular, it is noted that CPE 822 may be any combination of GW 823, MHD 825 and display 826.

In the embodiment depicted in FIG. 8, MHD 825 includes processor 801 coupled via shared bus 802 to storage media collectively identified as storage 810. MHD 825, as depicted in FIG. 8, further includes network adapter 820 that interfaces MHD 825 to local area network (LAN) 824 and through which MHD 825 receives multimedia content 860. GW 823 is shown providing a bridge between access network 830 and LAN 824, and receiving multimedia content 860 from access network 830.

In embodiments suitable for use in IP based content delivery networks, MHD 825, as depicted in FIG. 8, may include transport unit 831 that assembles the payloads from a sequence or set of network packets into a stream of multimedia content. In coaxial based access networks, content may be delivered as a stream that is not packet based and it may not be necessary in these embodiments to include transport unit 831. In a co-axial implementation, however, clients, such as CPE 822, may require tuning resources (not explicitly depicted in FIG. 8) to "filter" desired content from other content that is delivered over the coaxial medium simultaneously and these tuners may be provided in MHDs 825. The stream of multimedia content received by transport unit 831 may include audio information and video information and transport unit 831 may parse or segregate the two to generate video stream 832 and audio stream 834 as shown.

Video and audio streams 832 and 834, as output from transport unit 831, may include audio or video information that is compressed, encrypted, or both. A decoder unit 840 is shown as receiving video and audio streams 832 and 834 and generating native format video and audio streams 842 and 844. Decoder 840 may employ any of various widely distributed video decoding algorithms including any of the Motion Pictures Expert Group (MPEG) standards, or Windows Media Video (WMV) standards including WMV 9, which has been standardized as Video Codec-1 (VC-1) by the Society of Motion Picture and Television Engineers. Similarly decoder 840 may employ any of various audio decoding algorithms including Dolby® Digital, Digital Theatre System (DTS) Coherent Acoustics, and Windows Media Audio (WMA).

The native format video and audio streams 842 and 844 as shown in FIG. 8 may be processed by encoders/digital-to-analog converters (encoders/DACs) 850 and 870 respectively to produce analog video and audio signals 852 and 854 in a format compliant with display 826, which itself may not be a part of MHD 825. Display 826 may comply with National Television System Committee (NTSC), Phase Alternating Line (PAL) or any other suitable television standard.

Storage 810 encompasses persistent and volatile media, fixed and removable media, and magnetic and semiconductor media. Storage 810 is operable to store instructions, data, or both. Storage 810 as shown may include sets or sequences of instructions, namely, an operating system 812, a remote control (RC) application program identified as RC module 814, an electronic programming guide (EPG) 816, and spending limits 818. Operating system 812 may be a UNIX or UNIX-like operating system, a Windows® family operating system, or another suitable operating system.

EPG 816 represents a guide to the multimedia content provided to CPE 822 via MCDN system 200 (see FIG. 2), and may be shown to the user as an element of the user interface. The user interface may include a plurality of menu items arranged according to one or more menu layouts, which enable a user to operate MHD 825. The user may operate the user interface, including EPG 816, using a remote control, such as remote control device 110, in conjunction with RC module 814.

Figure 9:
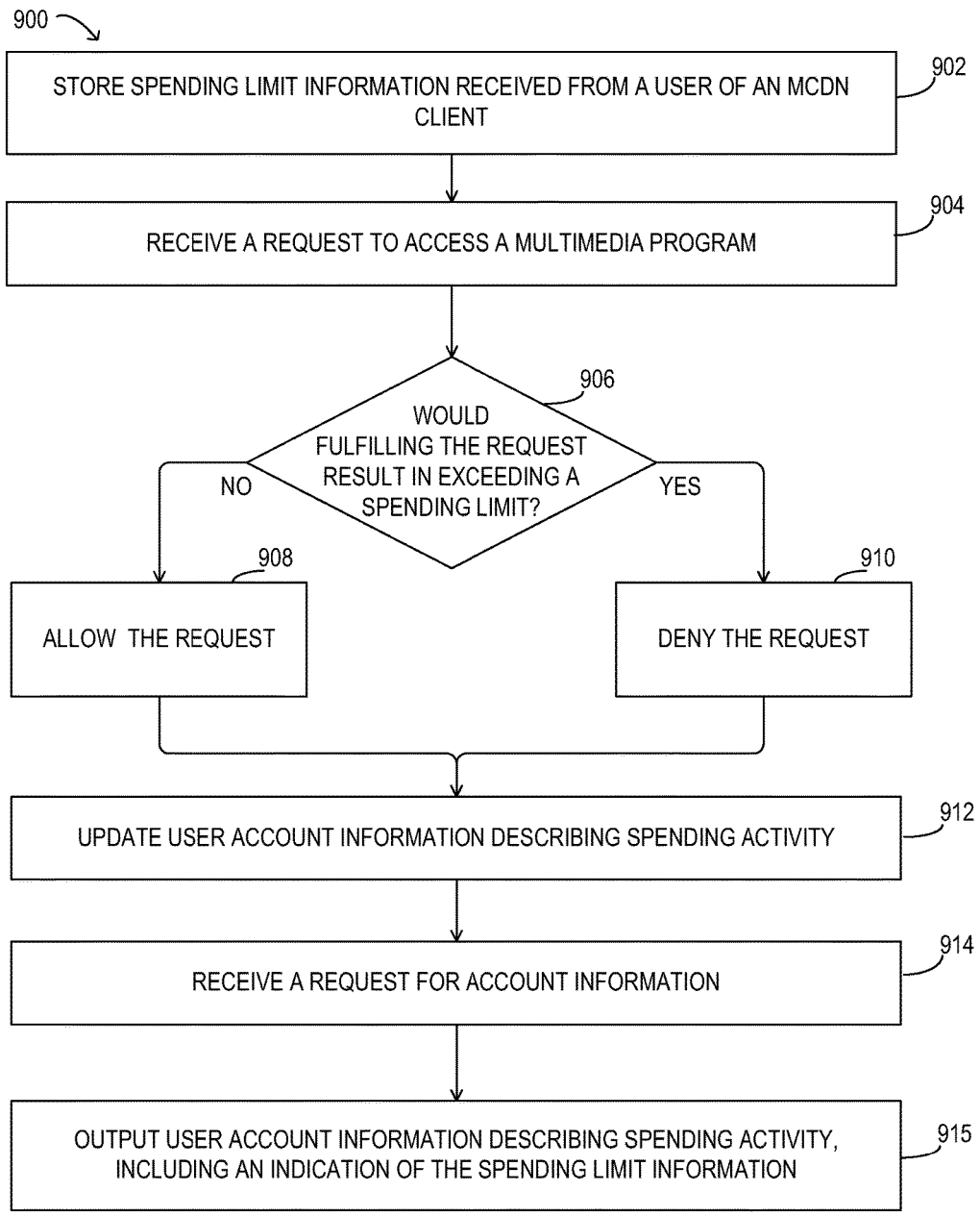
FIG. 9 illustrates an embodiment of a method for applying spending limits.

Turning now to FIG. 9, an embodiment of method 900 for applying spending limits on an MCDN is shown in flowchart form. Spending limit information received from a user of an MCDN client may be stored (operation 902). The spending limit information may be similar to spending limit profile 600 (see FIG. 6). In some embodiments, the spending limit information may be forwarded to an MCDN server for storage. Then, a request to access a multimedia program may be received (operation 904). The request may be received from the user using an MCDN user account, or from another authorized user using a sub-account associated with the MCDN user account. The request may be received from any access point provided by a USF application, such as STB/IPTV 702, web browser 704, or mobile wireless 706 (see FIG. 7).

Next, a decision may be made if fulfilling the request would result in a spending limit being exceeded (operation 906). If the result of operation 906 is NO, then method 900 may allow the request (operation 908). Allowing the request may result in user access to the requested multimedia program. The multimedia program may be accessed from any access point provided by a USF application, such as STB/IPTV 702, web browser 704, or mobile wireless 706 (see FIG. 7). If the result of operation 906 is YES, then method 900 may deny the request (operation 910).

Method 900 may continue to update user account information describing spending activity (operation 912). The spending activity may be tracked with respect to spending limit information. A request for account information may then be received (operation 914). The request may be received from a user after login to an MCDN user account. In response to the request, user account information may be output describing spending activity, including an indication of the spending limit information (operation 915).

Figure 10:
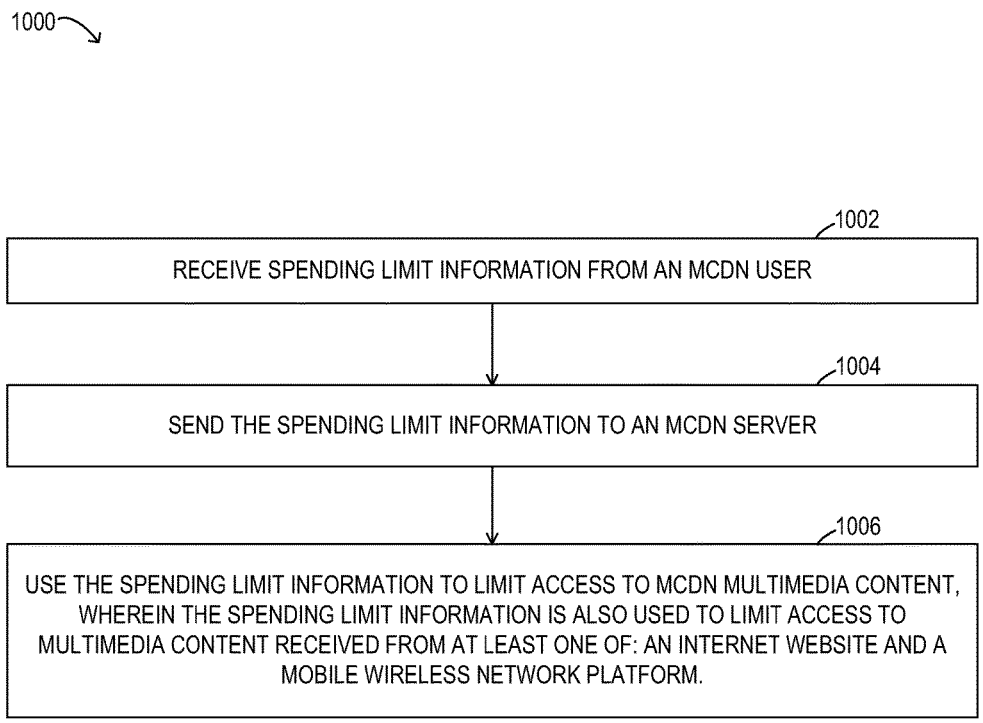
FIG. 10 illustrates an embodiment of a method for applying spending limits.

Turning now to FIG. 10, an embodiment of method 1000 for applying spending limits on an MCDN is illustrated in flowchart form. In some examples, elements in method 1000 may be performed by a CPE, such as CPE 822 (see FIG. 8). In certain embodiments, operations depicted in method 1000 may be rearranged or omitted, or may be optional.

Spending limit information may be received from an MCDN user (operation 1002). The spending limit information may be designated for the user's MCDN user account, or a related sub-account. The spending limit information may be sent to an MCDN server (operation 1004). The MCDN server may store the spending limit information for the MCDN account. The spending limit information may be used to limit access to MCDN multimedia content, wherein the spending limit information is also used to limit access to multimedia content received from at least one of: an Internet website and a mobile wireless network platform (operation 1006).

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A method for controlling electronic storefronts in a multimedia content distribution network, the method comprising:

sending, by a server, electronic video content retrieved from one or more memories into the multimedia content distribution network for delivery to a network address of a set-top box, the electronic video content including a trigger that instructs a processor in the set-top box to access a memory in the set-top box to display options in a graphical user interface on a display device, and an embedded selectable trigger that, when selected by a user, causes the processor to access the memory in the set-top box to display at least one popup on the display device, wherein the at least one popup includes an exclusive offer based on past purchase history, viewing history, and geographic location of the user, and a non-exclusive offer based on a sponsorship of a television program;

receiving, by the server, a request sent from the set-top box in response to selection of the embedded selectable trigger in the electronic video content that is activated by a remote controller, the request including an identifier of selected electronic video content;

determining an asset type of the selected electronic video content, the asset type selected from one of Internet Protocol assets, Internet assets, physical assets, and mobile assets;

storing, by the server in the one or more memories, electronic database associations between different asset types of content and different electronic storefronts;

retrieving one of the different electronic storefronts having an association with a determined asset type of the electronic video content, the one of the different electronic storefronts describing purchasable assets associated with the determined asset type of the selected electronic video content;

sending, by the server, a retrieved electronic storefront into the multimedia content distribution network for routing to the set-top box, the retrieved electronic storefront having selections for purchasable assets and being displayed on the display device;

receiving, by the server, an electronic purchase request sent from the set-top box requesting a purchase of one of the purchasable assets in the retrieved electronic storefront;

sending, from the server to the set-top box, a prompt for authentication credentials in response to the electronic purchase request;

accessing, by the server, spending limit information previously stored in the one or more memories, including a predetermined time period to access the one of the purchasable assets, associated with the authentication credentials of the multimedia content distribution network;

applying, by the server, the spending limit information, including the predetermined time period, to constrain access to the one of the purchasable assets; and in response to the spending limit information indicating that granting the request would result in an exceeding of the spending limit information by exceeding at least one of a spending limit and the predetermined time period, transmitting a denial of the request over the multimedia content distribution network to the set-top box for display on the display device, unless the spending limit information that is exceeded is overridden by a designated user name and password; and in response to the spending limit information indicating that granting the request would not result in an exceeding of the spending limit information by exceeding at least one of a spending limit and the predetermined time period, transmitting an approval of the request to the set-top box over the multimedia content distribution network for display on the display device, wherein when an approved request is for a physical asset, a purchase order fulfillment request is sent to a fulfillment center to complete the packaging and shipping of the physical asset, and an inventory system is notified to update inventory data of the physical asset, and wherein when an approved request is for an intangible electronic asset, instructions are sent for downloading the electronic asset, including information regarding access limitations.

2. The method of claim 1,
wherein the spending limit information includes a plurality of spending limits associated with a multimedia content distribution network account.

3. The method of claim 1,
wherein the spending limit information includes a plurality of predetermined time periods to access multimedia content using a multimedia distribution network account.

4. The method of claim 1,
wherein the spending limit information indicates a maximum number of accessed multimedia programs.

5. The method of claim 1,
wherein the spending limit information is received from the set-top box.

6. A server for controlling electronic storefronts for use with a set-top box over a multimedia content distribution network, comprising:
a processor; and
one or more memories having multimedia content accessible to the processor, including program instructions executable by the processor, the executed program instructions performing the following operations sending electronic video content retrieved form one or more memories into the multimedia content distribution network for routing to the set-top box, the electronic video content including a trigger that instructs the set-top box to display options in a graphical user interface on a display device, and an embedded selectable trigger that, when selected by a user, causes the processor to access the memory in the set-top box to display at least one popup on the display device, wherein the at least one popup includes an exclusive offer based on past purchase history, viewing history, and geographic location of the user, and a non-exclusive offer based on a sponsorship of a television program;

receiving a request sent from the set-top box, the set-top box generating the request in response to selection of the embedded selectable trigger in the electronic video content that is activated by a remote controller, the request including an identifier of selected video content;

determining an asset type of the selected electronic video content, the asset type selected from one of Internet Protocol assets, Internet assets, physical assets, and mobile assets;

storing in the one or more memories electronic database associations between different types of content and different electronic storefronts;

retrieving an electronic storefront of the different electronic storefronts having a database association with a determined asset type of the electronic video content, the retrieved electronic storefront describing purchasable assets associated with the determined asset type of the electronic video content;

sending the retrieved electronic storefront into the multimedia content distribution network for routing to the set-top box, the retrieved electronic storefront including selections for purchasable assets that are displayed on the display device;

retrieving an electronic purchase request sent from the set-top box, the electronic purchase request requesting a purchase for one of the purchasable assets in the retrieved electronic storefront;

sending a prompt to the set-top box for authentication credentials in response to the electronic purchase request;

accessing spending limit information previously stored in the one or more memories, including a predetermined time period to access the one of the purchasable assets, associated with the authentication credentials;

applying the spending limit information, including the predetermined time period, to constrain access to the one of the purchasable assets; and in response to the spending limit information indicating that granting the request would result in an exceeding of the spending limit information by exceeding at least one of a spending limit and the predetermined time period, transmitting a denial of the request over the multimedia content distribution network to the set-top box for display on the display device, unless the spending limit information that is exceeded is overridden by a designated user name and password; and in response to the spending limit information indicating that granting the request would not result in an exceeding of the spending limit information by exceeding at least one of a spending limit and the predetermined time period, transmitting an approval of the request to the set-top box over the multimedia content distribution network for display on the display device, wherein when an approved request is for a physical asset, a purchase order fulfillment request is sent to a fulfillment center to complete the packaging and shipping of the physical asset, and an inventory system is notified to update inventory data of the physical asset, and wherein when an approved request is for an intangible electronic asset, instructions are sent for downloading the electronic asset, including information regarding access limitations.

7. The customer premises equipment of claim 6,
wherein the spending limit information includes a plurality of spending limits associated with a multimedia content distribution network account.

8. The customer premises equipment of claim 6,
wherein the spending limit information includes a plurality of spending limits associated with a multimedia content distributions network user account.

9. The customer premises equipment of claim 8,
wherein the program instructions includes instructions to modify the spending limit information according to the asset type.

10. The server of claim 6,
wherein the spending limit information is received from the set-top box.

11. The server of claim 6,
wherein the spending limit information indicates a maximum number of accessed multimedia programs.

\* \* \* \* \*

UNITED STATES PATENT AND TRADEMARK OFFICE
CERTIFICATE OF CORRECTION

PATENT NO. : 10,068,269 B2
APPLICATION NO. : 12/617464
DATED : September 4, 2018
INVENTOR(S) : David J. Piepenbrink et al.

Page 1 of 1

It is certified that error appears in the above-identified patent and that said Letters Patent is hereby corrected as shown below:

In the Claims

In Column 20, Line 1 (Claim 6, Line 9), the expression "form one" should correctly read -- from one --.

Signed and Sealed this
Second Day of April, 2019

Andrei Iancu
*Director of the United States Patent and Trademark Office*